(12) United States Patent
Azegami et al.

(10) Patent No.: US 10,469,799 B2
(45) Date of Patent: Nov. 5, 2019

(54) MULTIPLEXER AND IMAGE CAPTURING DEVICE PROVIDED WITH SAID MULTIPLEXER

(71) Applicant: KOWA COMPANY, LTD., Aichi (JP)

(72) Inventors: Tomohisa Azegami, Saitama (JP); Tatsuya Kimbara, Saitama (JP)

(73) Assignee: KOWA COMPANY, LTD., Aichi (JP)

( * ) Notice: Subject to any disclaimer, the term of this patent is extended or adjusted under 35 U.S.C. 154(b) by 0 days.

(21) Appl. No.: 16/092,015

(22) PCT Filed: Apr. 21, 2017

(86) PCT No.: PCT/JP2017/015967
§ 371 (c)(1),
(2) Date: Oct. 8, 2018

(87) PCT Pub. No.: WO2017/183706
PCT Pub. Date: Oct. 26, 2017

(65) Prior Publication Data
US 2019/0124293 A1    Apr. 25, 2019

(30) Foreign Application Priority Data
Apr. 22, 2016  (JP) ................. 2016-086017

(51) Int. Cl.
| H04N 7/08 | (2006.01) |
| H04N 5/247 | (2006.01) |
| H04N 7/10 | (2006.01) |
| H04N 17/00 | (2006.01) |

(52) U.S. Cl.
CPC .......... *H04N 7/0806* (2013.01); *H04N 5/247* (2013.01); *H04N 7/102* (2013.01); *H04N 17/002* (2013.01)

(58) Field of Classification Search
CPC ...... H04N 7/0806; H04N 5/232; H04N 5/247; H04N 7/102; H04N 7/18; H04N 17/002
USPC ........................................................ 348/187
See application file for complete search history.

(56) References Cited

U.S. PATENT DOCUMENTS

| 5,883,676 | A | * | 3/1999 | Miyazaki | ............. | H04N 5/2624 |
| | | | | | | 348/564 |
| 5,990,974 | A | * | 11/1999 | Amino | ..................... | H04N 9/12 |
| | | | | | | 348/564 |
| 6,870,861 | B1 | * | 3/2005 | Negishi | ................. | H04J 3/1641 |
| | | | | | | 370/537 |
| 2003/0112834 | A1 | * | 6/2003 | Karasawa | ........ | H04N 21/23608 |
| | | | | | | 370/537 |
| 2004/0127452 | A1 | * | 7/2004 | Van Tilburg | ........... | C07H 19/16 |
| | | | | | | 514/46 |
| 2017/0070656 | A1 | * | 3/2017 | Park | .................... | H04N 5/23203 |

FOREIGN PATENT DOCUMENTS

| JP | 2001-515665 | 9/2001 |
| JP | 2011-019058 | 1/2011 |

* cited by examiner

*Primary Examiner* — Michael Lee
(74) *Attorney, Agent, or Firm* — Duane Morris LLP (57) ABSTRACT

[Problem] To make a device compact and inexpensive by omitting a frame buffer.
[Solution] First packet data PD1 that is sequentially received from a first camera C1 and second packet data PD2 that is sequentially received from a second camera C2 are alternately and sequentially transmitted to an external device 2 before data for one screen is accumulated. Therefore, a frame buffer for saving the data for one screen is not necessary, and a device can be made correspondingly more compact and less expensive.

4 Claims, 5 Drawing Sheets

FIG. 5

MULTIPLEXER AND IMAGE CAPTURING DEVICE PROVIDED WITH SAID MULTIPLEXER

TECHNICAL FIELD

This invention relates to a multiplexer for transmitting packet data received from at least two cameras to an external device, and an image capturing device provided with said multiplexer.

BACKGROUND ART

Various kinds of configurations of multiplexers each transmitting packet data received from at least two cameras to an external device have been proposed (see patent related documents 1 and 2, for instance).

Figure 5:
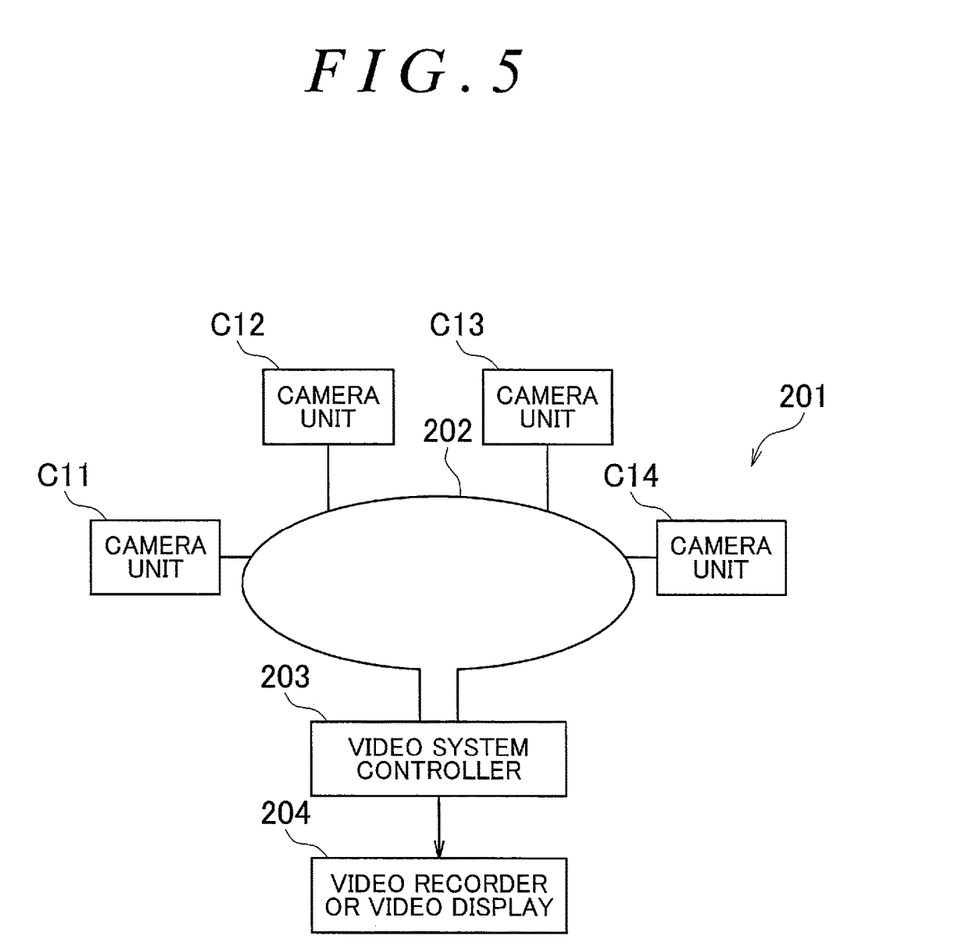
FIG. 5 is a block diagram that shows an instance of a conventional configuration of the multiplexer.

FIG. 5 is a block diagram that shows an instance of a conventional configuration of a multiplexer, and a multiplexer 201 has a video camera line 202 that connects with plural cameras C11, C12, C13, C14 and a video system controller 203 that connects with the video camera line 202, and is configured to transmit video signals from the respective cameras C11, . . . to a video recorder or a video display 204.

PATENT RELATED DOCUMENT

Patent related document 1: Japanese patent application publication No. 2001-515665
Patent related document 2: Japanese patent application publication No. 2011-19058

SUMMARY OF INVENTION

Problems to be Solved by Invention

In the multiplexer 201 as shown in FIG. 5, analogue signals are used, so that it is not possible to simultaneously transmit image signals obtained by simultaneously capturing images through the plural cameras C11, . . . from the video system controller 203 to the video recorder or the video display 204. As the result, when capturing images through the respective cameras C11, . . . in order without doing so at the same time, there is such a problem that exposure time is necessary for each camera and it is not possible to capture the images during each exposure time. Besides, a high-capacity buffer for storing images is necessary, and the device is made up-sized and expensive.

An object of the present invention is to provide a multiplexer and an image capturing device with said multiplexer for solving the above-mentioned problems.

Means for Solving Problems

Figure 1:
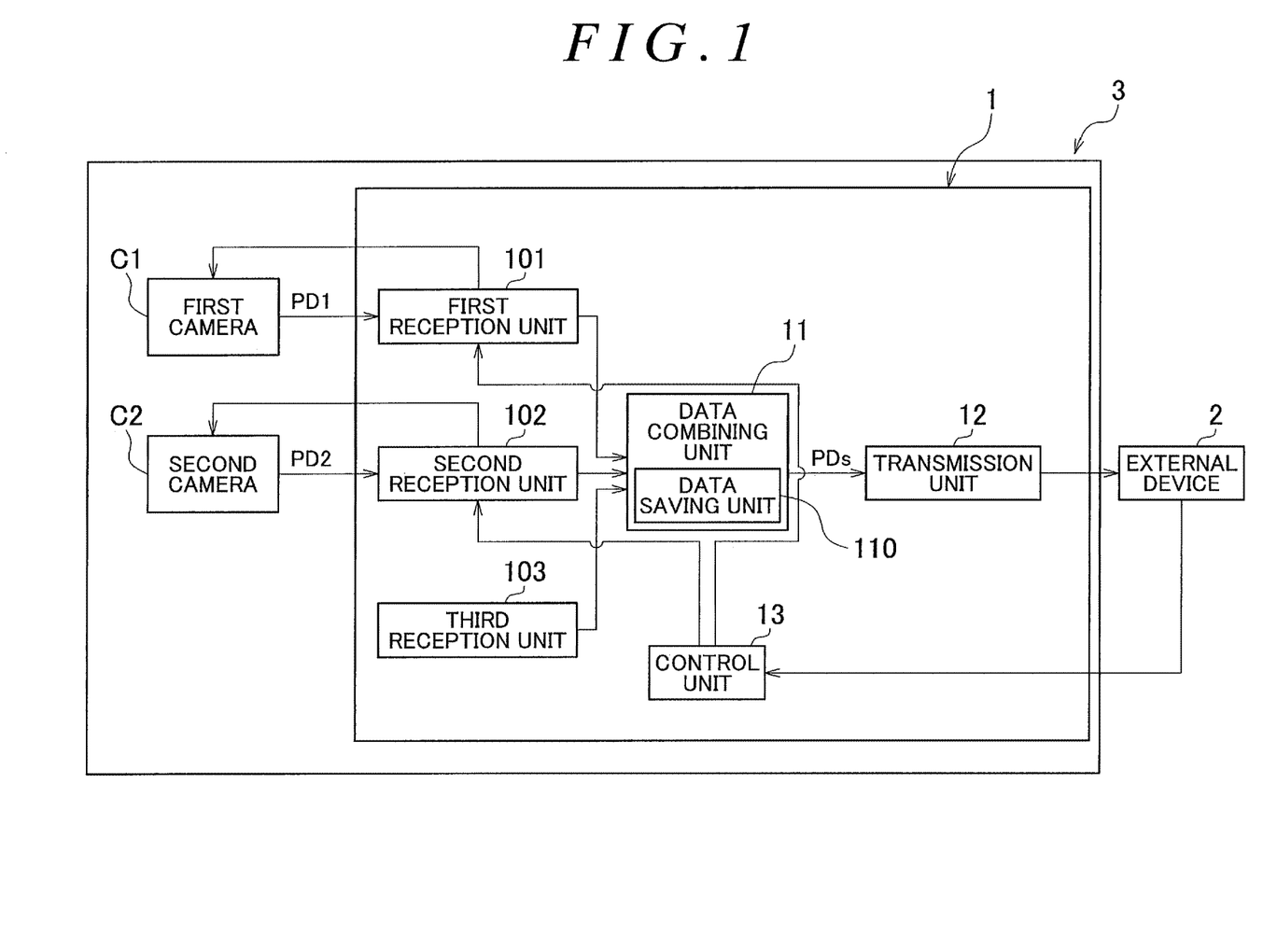
FIG. 1 is a block diagram that shows an instance of a configuration of a multiplexer and the like according to the invention.
Figure 2A:
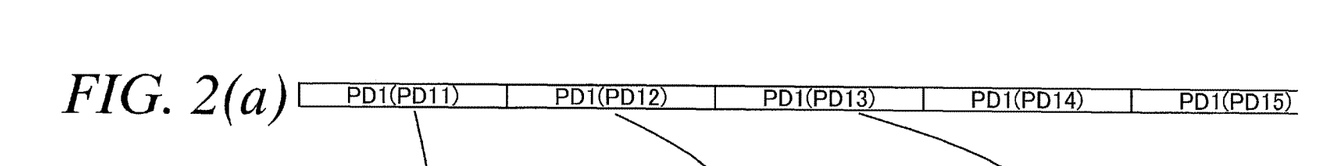
Figure 2B:
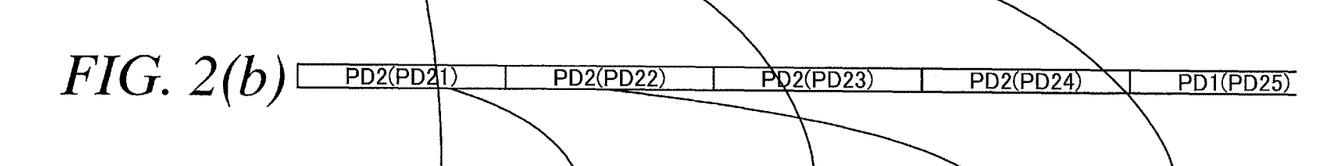
Figure 2C:
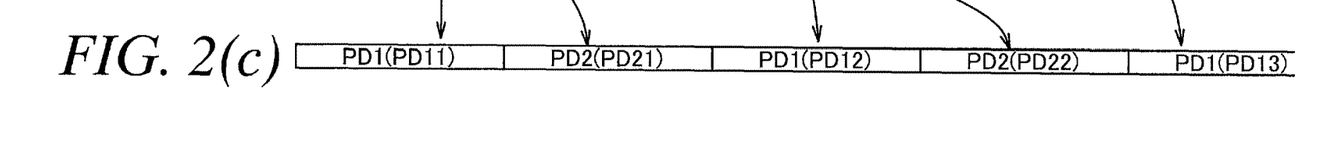

The first aspect of the invention is a multiplexer (1) exemplarily shown in FIG. 1, comprising:
a first reception unit (101) that sequentially receives first packet data (PD1) that are image signals from a first camera (C1);
a second reception unit (102) that sequentially receives second packet data (PD2) that are image signals from a second camera (C2);
a data combining unit (11) that connects with the reception units (101, 102) and prepares combined data ($PD_S$) where the first packet data (PD1) and the second packet data (PD2) are alternately arranged; and
a transmission unit (12) that connects with the data combining unit (11) and transmits the combined data ($PD_S$) to an external device (2),
wherein the first packet data (PD1) successively arranged in the combined data ($PD_S$) is data smaller than data for one screen, and
the second packet data (PD2) successively arranged in the combined data ($PD_S$) is data smaller than data for one screen.

The second aspect of the invention is the multiplexer, wherein the first packet data (PD1) sequentially arranged in the combined data ($PD_S$) and the second packet data (PD2) sequentially arranged in the combined data ($PD_S$) are respectively image data comprised of one pixel, plural pixels, one line or plural lines.

The third aspect of the invention is the multiplexer, wherein the data combining unit (11) has a data saving unit (110) that sequentially stores the first packet data (PD1) received by the first reception unit (101) and/or the second packet data (PD2) received by the second reception unit (102).

Figure 3A:
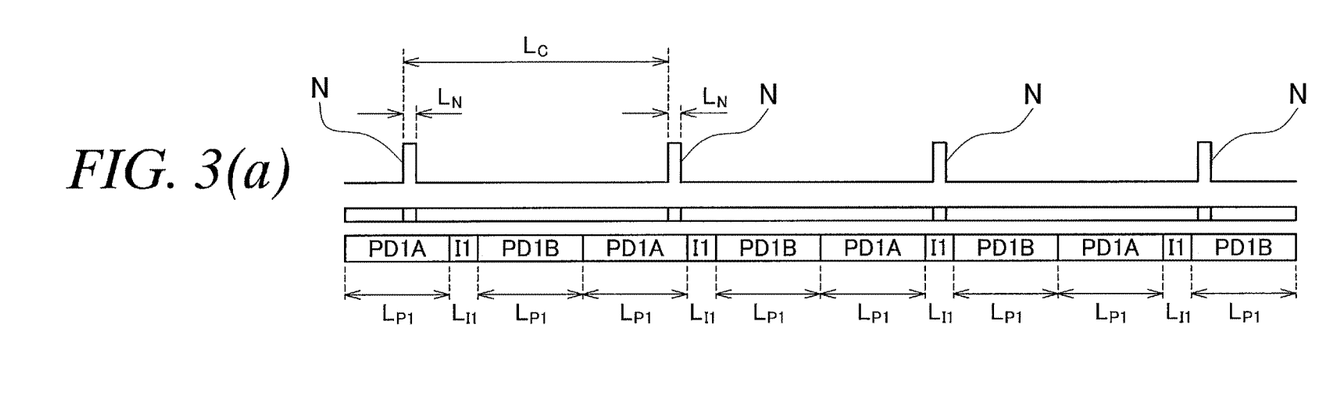
Figure 3B:
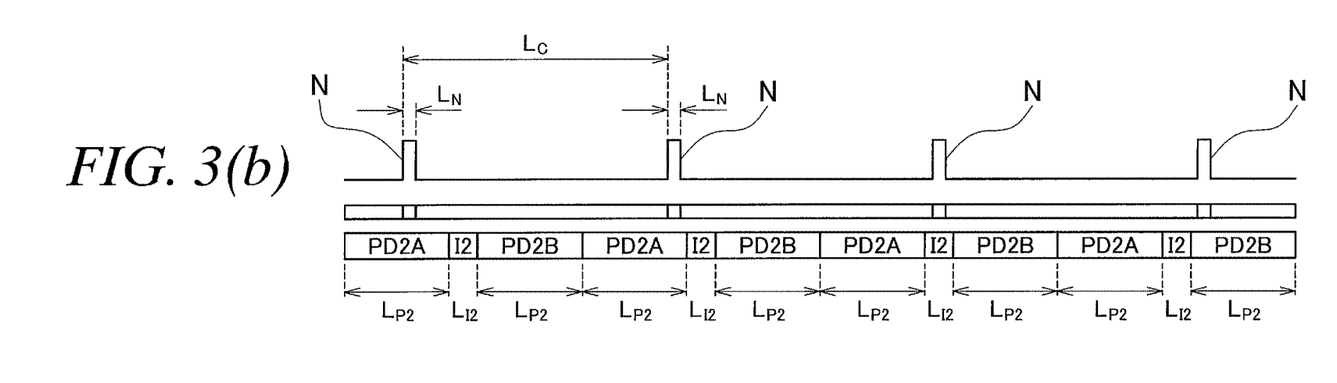

The fourth aspect of the invention is an image capturing device (3), comprising:
a first camera (C1) and a second camera (C2); and
the multiplexer (1),
whereby the first packet data (PD1) to be transmitted from the first camera (C1) to the first reception unit (101) is comprised of a first front packet data (PD1A) and a first rear packet data (PD1B) having the same contents as the first front packet data (PD1A), to be transmitted spacing a predetermined idle time (I1) after transmitting the first front packet data (PD1A), as exemplarily shown in FIG. 3(a),
the second packet data (PD2) to be transmitted from the second camera (C2) to the second reception unit (102) is comprised of a second front packet data (PD2A) and a second rear packet data (PD2B) having the same contents as the second front packet data (PD2A), to be transmitted spacing a predetermined idle time (I2) after transmitting the second front packet data (PD2A), as exemplarily shown in FIG. 3(b), and
below-mentioned expressions (1) through (4) are satisfied provided that duration of noise to occur at intervals of 10 μsec or more (See N in FIG. 3(a), (b) for reference, "the low frequency noise" hereinafter) is $L_N$, time with no noise from occurrence of one low frequency noise (N) to next occurrence of low frequency noise (N) is $L_C$, length of the first front packet data (PD1A) and the first rear packet data (PD1B) is $L_{P1}$, length of a predetermined idle time (I1) from the transmission of the first front packet data (PD1A) to the transmission of the first rear packet data (PD1B) is $L_{I1}$, length of the second front packet data (PD2A) and the second rear packet data (PD2B) is $L_{P2}$, and length of a predetermined idle time (I2) from the transmission of the second front packet data (PD2A) to the transmission of the second rear packet data (PD2B) is $L_{I2}$.

$$L_{I1} > L_N \quad (1)$$

$$2 \times L_{P1} + L_{I1} < L_C \quad (2)$$

$$L_{I2} > L_N \quad (3)$$

$$2 \times L_{P2} \times L_{I2} < L_c \quad (4)$$

The fifth aspect of the invention is the image capturing device, wherein the first camera (C1) transmits the first front packet data (PD1A) and the first rear packet data (PD1B) each attaching a code for detecting errors to the first reception unit (101), the second camera (C2) transmits the second front packet data (PD2A) and the second rear packet data (PD2B) each attaching a code for detecting errors to the second reception unit (102), the first reception unit (101) detects data disturbance of the first front packet data (PD1A) or the first rear packet data (PD1B) by checking the code for detecting errors from the first camera (C1) and transmits the first front packet data (PD1A) or the first rear packet data (PD1B) where the data disturbance is not detected to the data combining unit (11), and the second reception unit (102) detects data disturbance of the second front packet data (PD2A) or the second rear packet data (PD2B) by checking the code for detecting errors from the second camera (C2) and transmits the second front packet data (PD2A) or the second rear packet data (PD2B) where the data disturbance is not detected to the data combining unit (11).

The number in parentheses shows the corresponding element in the drawings for the sake of convenience, accordingly, the descriptions are not restricted and bound by the descriptions on the drawings.

Effects of Invention

According to the first to third aspects of the invention, one of the first packet data (that is, the first packet data sequentially arranged in the combined data) is data smaller than data for one screen, and one of the second packet data (that is, the second packet data sequentially arranged in the combined data) is data smaller than data for one screen, so that a buffer of large capacity, such as a frame buffer is not necessary, and the device may be made correspondingly compact and inexpensive.

According to the fourth and fifth aspects of the invention, it is possible to use a thin transmission cable, such as a 3CFB cable, even under an environment where a lot of low frequency noises occur due to power supply and the like, and to constitute a machine vision by attaching a digital camera for industrial use to an industrial robot or various inspection equipment.

BRIEF DESCRIPTION OF DRAWINGS

FIG. 2(*a*) is a view that shows data structure for explaining a structure of first packet data, and FIG. 2(*b*) is a view that shows data structure for explaining a structure of second packet data, and FIG. 2(*c*) is a view that shows data structure for explaining a structure of combined data.

FIG. 3(*a*) is a view that shows data structure for explaining the first packet data and the like, and FIG. 3(*b*) is a view that shows data structure for explaining the second packet data and the like.

FIG. 4(*a*), (*b*) are views that show data structure for explaining effects of the invention.

EMBODIMENTS FOR CARRYING OUT THE INVENTION

Embodiments of the invention are mentioned, referring to appended drawings FIGS. 1 to 4.

A multiplexer according to the invention is exemplarily shown with a reference number 1 in FIG. 1, and has a first reception unit 101 that sequentially receives image signals from a first camera C1 ("the first packet data" hereinafter) PD1, a second reception unit 102 that sequentially receives image signals from a second camera C2 ("the second packet data" hereinafter) PD2, a data combining unit 11 that connects with the reception units 101, 102 and prepares combined data $PD_S$ by combining the packet data PD1, PD2 from the reception units 101, 102, and transmission unit 12 that connects with the data combining unit 11 and transmits the combined data $PD_S$ to an external device 2. As exemplarily shown in FIG. 2(*c*), the combined data $PD_S$ prepared by the data combining unit 11 is made by alternately arranging the first packet data PD1 and the second packet data PD2, one of the first packet data PD1 (that is, the first packet data PD1 successively arranged in the combined data $PD_S$) is data smaller than data for one screen, and one of the second packet data PD2 (that is, the second packet data PD2 successively arranged in the combined data $PD_S$) is data smaller than data for one screen. Concretely, one of the first packet data PD1 and one of the second packet data PD2 may be image data of one pixel. That is, when the image data (that is, the image data per pixel) sequentially transmitted from the first camera C1 to the first reception unit 101 is PD11, PD12, PD13, . . . as exemplarily shown in FIG. 2(*a*), and the image data (that is, the image data per pixel) sequentially transmitted from the second camera C2 to the second reception unit 102 is PD21, PD22, PD23, . . . as exemplarily shown in FIG. 2(*b*), the combined data $PD_S$ may be comprised of PD11, PD21, PD12, PD22, PD13, PD23, as exemplarily shown in FIG. 2(*c*). Besides, one of the first packet data PD1 and one of the second packet data PD2 may be the image data comprised of plural pixels. Furthermore, one of the first packet data PD1 and one of the second packet data PD2 may be the image data of one line. In addition, one of the first packet data PD1 and one of the second packet data PD2 may be the image data of plural lines.

Two or more reception units 101, 102, . . . may be provided, three, such as reference numbers 101, 102, 103 may be provided, or four or more may be provided. When n number of reception units are provided (n is three or more), the respective reception units are referred to as "the first reception unit", "the second reception unit", . . . "the n-th reception unit", the cameras respectively connected with the reception units are referred to as "the first camera", "the second camera", . . . "the n-th camera", and the image signals from the respective cameras are referred to as "the first packet data", "the second packet data", . . . "the n-th packet data", the respective reception units may be connected with the data combining unit 11, the combined data $PD_S$ may be arranged in order of the first packet data, the second packet data, and the n-th packet data, and any of the packet data (that is, each packet data sequentially arranged in the combined data) may be data smaller than data for one screen.

The camera C1, . . . may start to capture the images by sending trigger signals from a control unit 13.

The data combining unit 11 may have a data saving unit 110 that sequentially stores one of both, or both, the first packet data PD1 received by the first reception unit 101, and the second packet data PD2 received by the second reception unit 102.

When capturing images through the first camera C1 or the second camera C2, it is necessary to secure exposure time before capturing images. When capturing images through the first camera C1, and thereafter capturing images through the second camera C2, it is necessary to secure the exposure time for each camera, C1 or C2, so that it is not possible to capture images during each exposure time. But, capturing images through the first camera C1 and the second camera C2 are simultaneously done according to the invention. Then, it is possible to simultaneously take respective exposure times, and to prevent waste of time in comparison with such a case where the exposure time should be separately secured.

If all of the data for one screen of one camera, such as the first camera C1, is transferred to the external device 2, and thereafter, the data for one screen of the other camera, such as the second camera C2, is transferred to the external device 2, a buffer of large capacity, such as a frame buffer is necessary, and the device may be made correspondingly large and expensive. But, one of the first packet data PD1 (that is, the first packet data PD1 sequentially arranged in the combined data $PD_S$) is data smaller than data for one screen, and one of the second packet data PD2 (that is, the second packet data PD2 sequentially arranged in the combined data $PD_S$) is data smaller than data for one screen according to the invention, so that a buffer of large capacity, such as a frame buffer is not necessary, and the device may be made correspondingly compact and inexpensive.

On the other hand, an image capturing device 2 may have the first camera C1, the second camera C2 and the above-mentioned multiplexer 1. Preferably, the above-mentioned first packet data PD1 (that is, the first packet data PD1 transmitted from the first camera C1 to the first reception unit 101) is comprised of two packet data PD1A, PD1B each having the same contents, as exemplarily shown in FIG. 3(a), and one packet data ("the first front packet data" hereinafter) PD1A is transferred, and thereafter the other packet data ("the first rear packet data" hereinafter) PD1B is transferred, spacing a predetermined idle time I1. Preferably, the above-mentioned second packet data PD2 (that is, the second packet data PD2 transmitted from the second camera C2 to the second reception unit 102) is comprised of two packet data PD2A, PD2B each having the same contents, as exemplarily shown in FIG. 3(b), and one packet data ("the second front packet data" hereinafter) PD2A is transferred, and thereafter the other packet data ("the second rear packet data" hereinafter) PD2B is transferred, spacing a predetermined idle time I2. Preferably, the following expressions (1) through (4) are satisfied provided that duration of noise N to occur at intervals of 10 μsec or more ("the low frequency noise" hereinafter) is $L_N$, time with no noise from occurrence of one low frequency noise N to next occurrence of low frequency noise N is $L_C$, length of the first front packet data PD1A and the first rear packet data PD1B is $L_{P1}$, length of a predetermined idle time I1 from the transmission of the first front packet data PD1A to the transmission of the first rear packet data PD1B is $L_{I1}$, length of the second front packet data PD2A and the second rear packet data PD2B is $L_{P2}$, and length of a predetermined idle time I2 from the transmission of the second front packet data PD2A to the transmission of the second rear packet data PD2B is $L_{I2}$.

$$L_{I1} > L_N \quad (1)$$

$$2 \times L_{P1} + L_{I1} < L_C \quad (2)$$

$$L_{I2} > L_N \quad (3)$$

$$2 \times L_{P2} + L_{I2} < L_c \quad (4)$$

Figure 4A:
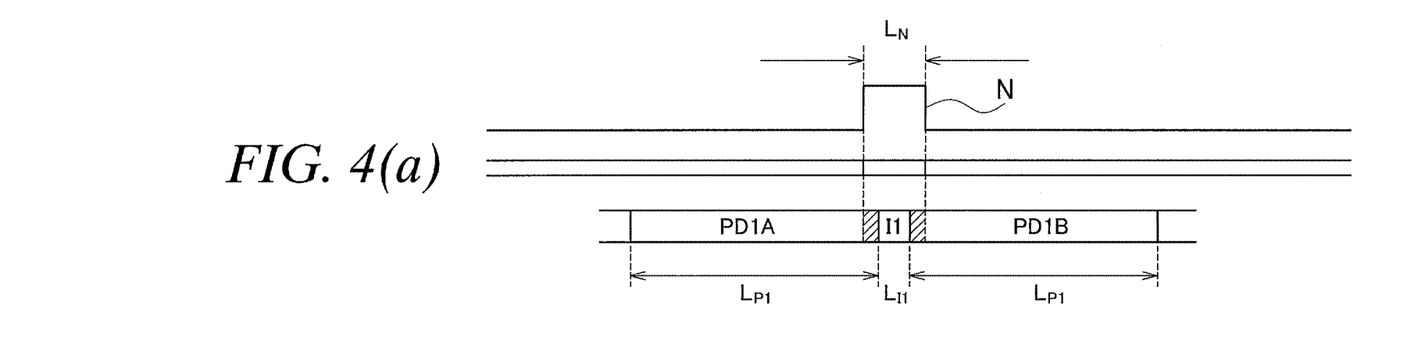
Figure 4B:
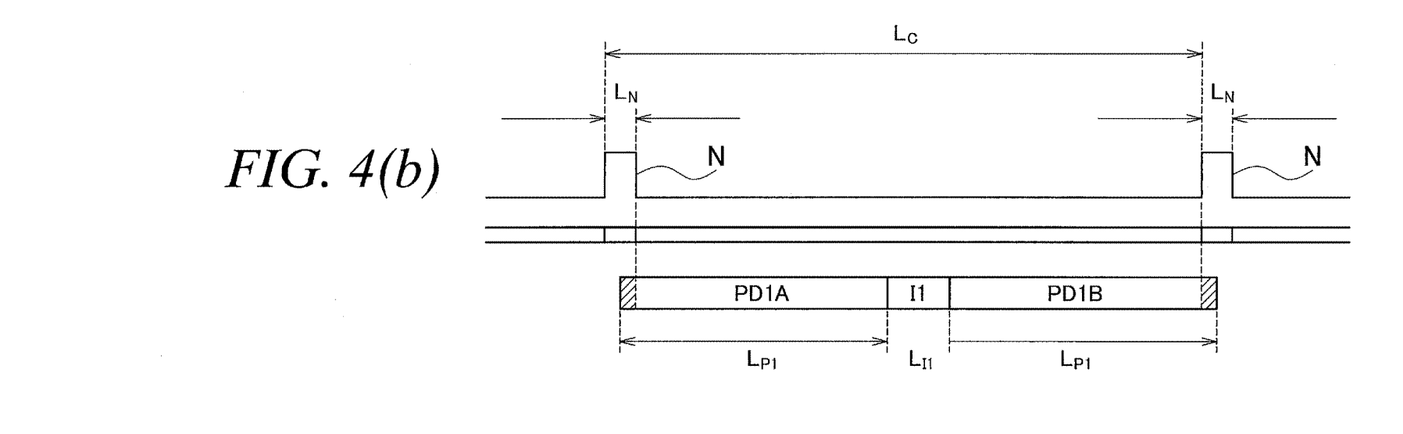

If the expression (1) is not satisfied, the first front packet data PD1A and the first rear packet data PD1B may receive influences from the same one low frequency noise N, as exemplarily shown with hatched areas in FIG. 4(a). If the expression (2) is not satisfied, the first front packet data PD1A and the first rear packet data PD1B may respectively receive influences from respectively separate low frequency noises, as exemplarily shown with hatched areas in FIG. 4(b) since both packet data are too long. Regarding the second packet data PD2, similarly, if the expression (3) is not satisfied, the second front packet data PD2A and the second rear packet data PD2B may receive influences from the same one low frequency noise N. If the expression (4) is not satisfied, the second front packet data PD2A and the second rear packet data PD2B may respectively receive influences from respectively separate low frequency noises since both packet data are too long. But, it is possible to avoid such situations according to the invention.

Since the time with no noise $L_C$ of the low frequency noise N is 10 μsec or so, preferably, the length $L_{P1}$ of one packet data PD1A, PD1B may be shorter than "5 μsec–$L_{I1}$/2". If transfer rate of the packet data PD1A, PD1B is 1.25 Gbps, preferably, size of one of packet data PD1A, PD1B is 64 words or more, and 112 words or less, and the length $L_{I1}$ of the idle time I1 is 10 words or so. Regarding the second packet data PD2, similarly, the length $L_{P2}$ of one packet data PD2A, PD2B is shorter than "5 μsec–$L_{I2}$/2". If transfer rate of the packet data PD2A, PD2B is 1.25 Gbps, preferably, size of one of packet data PD2A, PD2B is 64 words or more, and 112 words or less, and the length $L_{I2}$ of the idle time I1 is 10 words or so. In the invention, one word is 4 bites=32 bits, but actual transfer length (the length at the time of transfer) is 40 bits by 10b/8b conversion. According to a result of an experiment for influences from the low frequency noises; if the low frequency noise ±4 kV is given to a 3CFB cable of 40 m in addition to the above-mentioned conditions, the length is 36 bites or so at the maximum. Such a length varies depending on the transfer rate, the length and the thickness of the cable and noise voltage.

Preferably, the time with no noise $L_C$ is 10 μsec or more, and 200 μsec or less, the transfer rate for transferring the packet data PD1A, PD1B, . . . is 1.25 Gbps or more, and 6.25 Gbps or less, the size of the packet data PD1A, PD1B, . . . is 1 word or more, and 560 words or less, and the length of the idle time I1, I2 is 10 words or more, and 100 words or less.

According to the invention, at least one packet data of two packet data having the same contents which are sequentially transmitted (that is, the first front packet data PD1A and the first rear packet data PD1B, or the second front packet data PD2A and the second rear packet data PD2B) are received by the respective reception units 101, 102 without receiving the influences from the low frequency noises N. For such a reason, according to the invention, it is possible to use a thin transmission cable, such as a 3CFB cable, even under an environment where a lot of low frequency noises N occur due to power supply and the like, and to constitute a machine vision by attaching a digital camera for industrial use to an industrial robot or various inspection equipment. The above-mentioned low frequency noises N may be or may not be ones periodically occur.

In the above-mentioned embodiment, the packet data PD1A, PD1B, . . . having the same contents are transmitted twice from the respective cameras C1, C2 to the respective reception units 101, 102, but an operator may select as to whether such a transmission is done twice or not.

It is possible to apply the invention to CoaXpress standards, and also apply to such a case where packetized data is transmitted, such as a case where data is transmitted through the Ethernet (registered trademark) cable or with a USB, in addition to the CoaXpress standards. By transmitting the packet data having the same contents twice, usable band is made smaller, but it is possible to sufficiently achieve goals of 200 Mbps since the CoaXpress standards have the band from 1.25 Gbps to 6.125 Gbps. In the CoaXpress standards, it is possible to detect data disturbance when it occurs through CRC check (Cyclic Redundancy Check: It is possible to detect data errors, but is not possible to restore the data) since a CRC code is attached to the packetized data. So, the packet data that is correctly transmitted may be selected. When applying the invention to the cases excluding the CoaXpress standards, it is necessary to add the above-mentioned CRC code or a code for detecting errors, similar to the CRC code to the packet data. Preferably, the first camera C1 transmits the first front packet data PD1A and the first rear packet data PD1B each attaching the code for detecting errors to the first reception unit 101, and the first reception unit 101 detects data disturbance of the first front packet data PD1A or the first rear packet data PD1B by checking the code for detecting errors from the first camera C1 and transmits the first front packet data PD1A or the first rear packet data PD1B where the data disturbance is not detected to the data combining unit 11. Besides, preferably, the second camera C2 transmits the second front packet data PD2A and the second rear packet data PD2B each attaching the code for detecting errors to the second reception unit 102, and the second reception unit 102 detects data disturbance of the second front packet data PD2A or the second rear packet data PD2B by checking the code for detecting errors from the second camera C2 and transmits the second front packet data PD2A or the second rear packet data PD2B where the data disturbance is not detected to the data combining unit 11.

INDUSTRIAL APPLICABILITY

This invention can be also applied to an use to form parallax images in such a manner that left eye images are captured through the first camera C1 and right eye images are captured through the second camera C2, and these image signals (packet data) are transmitted to the external device 2.

EXPLANATION OF REFERENCE NUMBERS

1 Multiplexer
2 External device
3 Image capturing device
11 Data combining unit
12 Transmission unit
101 First reception unit
102 Second reception unit
110 Data saving unit
C1 First camera
C2 Second camera
I1, I2 Idle time
N Low frequency noise
PD1 First packet data
PD1A First front packet data
PD1B First rear packet data
PD2 Second packet data
PD2A Second front packet data
PD2B Second rear packet data
$PD_S$ Combined data

The invention claimed is:

1. An image capturing device, comprising:
  a first camera and a second camera; and
  a multiplexer, comprising,
    a first reception unit that sequentially receives first packet data that are image signals from the first camera;
    a second reception unit that sequentially receives second packet data that are image signals from the second camera;
    a data combining unit that connects with the reception units and prepares combined data where the first packet data and the second packet data are alternately arranged; and
    a transmission unit that connects with the data combining unit and transmits the combined data to an external device;
    wherein the first packet data successively arranged in the combined data is smaller than data for one screen; and
    the second packet data successively arranged in the combined data is smaller than data for one screen;
    whereby the first packet data to be transmitted from the first camera to the first reception unit is comprised of a first front packet data and a first rear packet data having the same contents as the first front packet data, wherein the first rear packet data is to be transmitted a predetermined idle time after the first front packet data is transmitted;
    the second packet data to be transmitted from the second camera to the second reception unit is comprised of a second front packet data and a second rear packet data having the same contents as the second front packet data, wherein the second rear packet data is to be transmitted a predetermined idle time after the second front packet data is transmitted; and
  expressions:

$$L_{I1} > L_N;$$

$$2 \times L_{P1} + L_{I1} < L_C;$$

$$L_{I2} > L_N; \text{ and}$$

$$2 \times L_{P2} \times L_{I2} < L_c$$

are satisfied, wherein $L_N$ is the duration of low-frequency noise events occurring at intervals of 10 μsec or more, $L_C$ is the time between one low frequency noise event and the subsequent low frequency noise event, $L_{P1}$ is the length of the first front packet data and the first rear packet data, $L_{I1}$ is the length of a predetermined idle time from the transmission of the first front packet data to the transmission of the first rear packet data, $L_{P2}$ is the length of the second front packet data and the second rear packet data, and $L_{I2}$ is the length of a predetermined idle time from the transmission of the second front packet data to the transmission of the second rear packet data.

2. The image capturing device according to claim 1, wherein the first packet data sequentially arranged in the combined data and the second packet data sequentially arranged in the combined data are respectively image data comprised of one pixel, plural pixels, one line or plural lines.

3. The image capturing device according to claim 1, wherein the data combining unit has a data saving unit that sequentially stores the first packet data received by the first reception unit and/or the second packet data received by the second reception unit.

4. The image capturing device according to claim 1,
wherein the first camera transmits the first front packet data and the first rear packet data each attaching a code for detecting errors to the first reception unit,
the second camera transmits the second front packet data and the second rear packet data each attaching a code for detecting errors to the second reception unit,
the first reception unit detects data disturbance of the first front packet data or the first rear packet data by checking the code for detecting errors from the first camera and transmits the first front packet data or the first rear packet data where the data disturbance is not detected to the data combining unit, and
the second reception unit detects data disturbance of the second front packet data or the second rear packet data by checking the code for detecting errors from the second camera and transmits the second front packet data or the second rear packet data where the data disturbance is not detected to the data combining unit.

* * * * *